United States Patent [19]

Greenhalgh

[11] 4,178,414
[45] Dec. 11, 1979

[54] METHOD OF TOUGHENING GLASS SHEETS

[75] Inventor: Geoffrey Greenhalgh, Orrell, near Wigan, England

[73] Assignee: Triplex Safety Glass Company Limited, Birmingham, England

[21] Appl. No.: 916,557

[22] Filed: Jun. 19, 1978

[30] Foreign Application Priority Data

Jun. 23, 1977 [GB] United Kingdom ............... 26360/77

[51] Int. Cl.² ........................................... C03B 27/00
[52] U.S. Cl. ..................................... 428/410; 65/114; 65/104
[58] Field of Search ......................... 65/104, 114, 115; 428/410

[56] References Cited

U.S. PATENT DOCUMENTS

| | | | |
|---|---|---|---|
| 1,960,222 | 5/1934 | Long ....................................... | 65/114 |
| 2,078,541 | 4/1937 | Monnier ................................ | 65/115 |
| 2,244,715 | 6/1941 | Long ................................... | 65/115 X |
| 3,873,295 | 3/1975 | Bates et al. ......................... | 65/114 X |
| 4,128,690 | 12/1978 | Boardman et al. ................. | 65/115 X |

*Primary Examiner*—Arthur D. Kellogg
*Attorney, Agent, or Firm*—Burns, Doane, Swecker & Mathis

[57] ABSTRACT

A method of thermally toughening a glass sheet in which the glass sheet is advanced into a flow of quenching gas directed towards at least one surface of the sheet to induce overall toughening stress in the glass sheet. The advance of the sheet relative to the quenching gas flow is terminated, either by halting the sheet in the flow or by moving the outlets providing the flow with the sheet, so that at least one surface of the sheet is subjected to localized gas flows. The toughened glass sheet so produced has a distribution of regions of more highly toughened glass interspersed with regions of lesser toughened glass.

15 Claims, 9 Drawing Figures

METHOD OF TOUGHENING GLASS SHEETS

BACKGROUND OF THE INVENTION

This invention relates to the production of flat or curved sheets of thermally toughened glass, such as are used for example as motor vehicle side or rear windows.

In most countries there are official regulations specifying the fracture requirements for toughened glass sheets which are to be used as side or rear windows for motor vehicles.

Typically such regulations specify that the toughened glass sheets shall be fractured by localised impact at a defined position on the glass sheet, two particular positions being at the geometrical centre of the glass sheet and at a position adjacent the edge of the sheet. It is then required that areas of the fractured glass sheet should be selected where the particle count is a minimum and where the particle count is a maximum and limitations are placed on the minimum and maximum particle counts permissible in such areas. The minimum particle count permissible determines the maximum size of particles resulting from fracture so as to limit the danger of laceration by larger particles subsequent to fracture of the glass sheet in an accident. The maximum particle count permissible determines the minimum fineness of particles resulting from accidental fracture of the glass sheet so as to limit the danger of ingestion of fine glass particles. At present motor vehicle side and rear windows are made from glass of about 4.0 mm to 6.0 mm thickness and can be uniformly toughened so as to meet official fracture requirements.

For example glass sheets of thickness 4 mm and above meet the proposed E.E.C. standard referred to below if uniformly toughened to have a central tensile stress in the range 55 MN/m$^2$ to 59 MN/m$^2$. However in the interest of reducing weight there is now a trend towards the use of thinner glass to motor vehicles e.g. of about 3.0 mm thickness, glass of thickness in the range 2.5 mm to 3.5 mm being of particular interest.

In the draft standard under discussion by the European Economic Community (EEC) it is required that the number of particles in any 5 cm×5 cm square traced on the fractured glass, excluding a 3 cm wide band around the edge of the glass sheet and a circular area of 7.5 cm radius around the point from which fracture is initiated, should be 50 at the minimum and 300 at the maximum.

The proposed E.E.C. standard also has the requirement that the fractured glass sheet shall not contain any elongated particles with jagged ends of more than 6 cm in length, such particles being referred to as "splines".

British Standard No. BS 5282 entitled "ROAD VEHICLE SAFETY GLASS" is less restrictive than the proposed E.E.C. standard in that it specifies for glass less than 4 mm in thickness a minimum particle count of 40 in a 5 cm×5 cm square may be permitted and the maximum permitted particle count in a 5 cm×5 cm square may be 400. The British Standard also basically prohibits the presence of splines of more than 6 cm in length in the fractured test glass. The British Standard also requires that no splines are to be present in the fractured glass sheet.

It had been found difficult to toughen thinner glass sheets to meet the official fracture requirements, this difficulty being particularly evident in a size greater than about 1100 mm×500 mm this is about the size of the smallest vehicle rear window in current production. Many vehicle side windows are also of about this size or greater.

In U.S Pat. No. 4,128,690 assigned to the same assignee as the present application there is described and claimed a glass sheet for use as a side or rear window for a motor vehicle and of thickness in the range 2.5 mm to 3.5 mm having characteristics which have been discovered enable the sheet to meet at least the official fracture requirements laid down in British Standard No. BS 5282, the glass sheet being differentially quenched to produce in the glass sheet a distribution of regions of more highly toughened glass interspersed with regions of lesser toughened glass, the average central tensile stress in the glass being in the range of from a maximum of 62 MN/m$^2$ for all glass thicknesses from 2.5 mm to 3.5 mm to a minimum of 56.5 MN/m$^2$ for 2.5 mm thick glass varying inversely with thickness down to a minimum of 53 MN/m$^2$ for 3.5 mm thick glass, and there being a distribution of medium toughened glass areas interspersed among said more highly toughened and said lesser toughened regions in the glass sheet and in which there are major and minor principal stresses acting in the plane of the glass sheet, the difference between said major and minor principal stresses in at least some of said medium toughened areas being at a maximum in the range 8 MN/m$^2$ to 25 MN/m$^2$, the major principal stresses in adjacent ones of such medium toughened areas being in substantially different directions, and the distance between the centres of such adjacent areas being in the range 15 mm to 30 mm, the number and location of such adjacent areas being sufficient that upon fracture there is an absence of splines of more than 6 cm in length in the glass sheet.

A glass sheet having the above characteristics was produced, as described in U.S. Pat. No. 4,128,690, by quenching a distribution of regions of the glass sheet at a maximum rate so that interspersed regions of the glass sheet are simultaneously quenched at a minimum rate, regulating said maximum quenching rate and the size and spacing of the regions of the glass sheet which are quenched at a maximum rate to give the above characteristics.

In carrying out the above method quenching was effected by directing quenching jets at the glass sheet, and imparting a vertical oscillation or a circular oscillation to the quenching jets to produce the required distribution of regions of the glass sheet quenched at a maximum rate. The quenching could also be effected by directing stationary quenching jets at the glass sheet to produce the required distribution of regions of the glass sheet quenched at a maximum rate.

SUMMARY

According to the present invention there is provided a method of toughening a glass sheet in which the glass sheet is advanced into a flow of quenching gas directed towards at least one surface of the glass sheet from individual gas outlets to induce overall toughening stresses therein, advance of the sheet relative to the flow of quenching gas being terminated for a predetermined time, whereby localised gas flows are applied to at least said one surface of the glass sheet from said individual gas outlets during said predetermined time to produce in the glass as the toughening stresses develop a distribution of regions of more highly toughened glass interspersed with regions of lesser toughened glass, in which distribution there are areas in which there are major and minor principal stresses acting in the plane of the glass sheet, and the advance of the glass sheet relative to the flow of quenching gas is continued after said predetermined time.

In a preferred embodiment of the invention the glass sheet is advanced into the flow of quenching gas and is halted in the flow for said predetermined time.

In another embodiment of the invention the glass sheet is advanced into the flow of quenching gas and the individual gas outlets providing the flow of quenching gas are moved in the same direction and at the same speed as the glass sheet during said predetermined time.

The invention also comprehends advancing the glass sheet between flows of quenching gas which are directed from individual gas outlets towards both faces of the glass sheet and terminating advance of the glass sheet relative to the flow of quenching gas operative on at least one face of the glass sheet during said predetermined time. Alternatively, in this case, advance of the glass sheet relative to the flows of quenching gas operative on both faces of the glass sheet may be terminated for said predetermined time.

The invention may be applied to a glass sheet which is being advanced horizontally on a roller conveyor through a quenching station wherein flows of quenching gas are directed from individual gas outlets against at least one or both faces of the glass sheet.

The invention also includes a method comprising advancing the glass sheet horizontally on a gaseous support through a quenching station wherein at least the lower face of the glass sheet is subjected to a flow of quenching gas directed from individual gas outlets against the lower face of the sheet, said flow of quenching gas also providing the gaseous support for the sheet. In this case a flow of quenching gas may also be directed from individual gas outlets against the upper face of the glass sheet.

In each of the methods according to the invention, the glass sheet may be subjected to additional localised gas flows constituted by an array of gas jets operative on at least part of one or both faces of the glass sheet in addition to the main flow of quenching gas during the predetermined time in which advance of the glass sheet relative to the main flow of quenching gas is terminated. The array of gas jets may be spaced apart in rows transversely of the direction of advance of the glass sheet with the rows spaced apart in the direction of advance of the sheet.

The invention also comprehends a toughened glass sheet produced by the method of the invention and for use as a side or rear window for a motor vehicle.

BRIEF DESCRIPTION OF THE DRAWINGS

In order that the invention may be more clearly understood some embodiments thereof will now be described, by way of example, with reference to the accompanying drawings in which.

DESCRIPTION OF PREFERRED EMBODIMENTS

Figure 1:
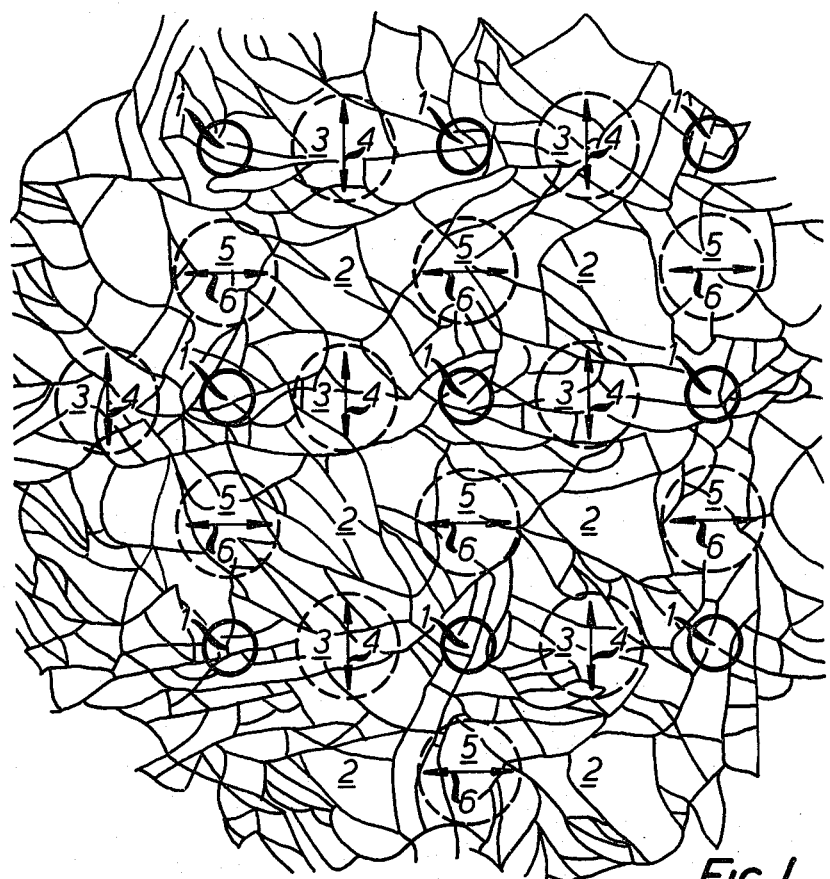
FIG. 1 illustrates the fracture pattern of a differentially toughened glass sheet suitable for a side or rear window of a motor vehicle produced by the method of the invention.

FIG. 1 illustrates the fracture pattern of a toughened glass sheet suitable for use as the side window or rear window of a motor vehicle produced by the method of the invention. The glass sheet has a distribution, in rectangular array, of localised areas 1 of more highly toughened glass interspersed with areas 2 of lesser toughened glass. Areas 3 of the glass have a medium toughening stress and in each of the areas 3 the principal stresses are unequal with the major principal stress acting in the direction indicated by the arrows 4.

Areas 5 of the glass also have a medium toughening stress and have unequal principal stresses with the major principal stress 6 in each area 5 acting in a direction substantially perpendicular to the direction of the major principal stress 4 in each of the areas 3.

Normal toughening stresses are produced in each of the areas 1, 2, 3 and 5 of the glass sheet to an extent which is dependent on the rate of quenching of those areas. A high central tensile stress which is of equal magnitude in all directions in the plane of the glass sheet is produced in the more highly toughened areas 1, a low central tensile stress is produced in the lesser toughened areas 2, and compensating compressive stresses are produced in both surfaces of the glass sheet.

The medium toughening stresses produced in the areas 3 and 5 of the glass sheet are a combination of the normal toughening stresses of equal magnitude in all directions in the plane of the glass sheet, and additional area stresses produced in the areas 3 and 5 due to the different rates at which the adjacent areas 1 and 2 are cooled and contract. These area stresses are not of equal magnitude in all directions in the plane of the glass sheet. The central tensile stress in the areas 3 and 5 of the glass sheet due to the combined effect of the normal toughening stresses and the area stresses can be resolved into unequal principal stresses in the plane of the glass sheet namely a major principal tensile stress and a minor principal tensile stress acting at right angles to the major principal tensile stress.

As shown by the arrows 6 in the areas 5 the major principal tensile stress 6 acts in a direction perpendicular to the direction of the major principal tensile stress 4 in the areas 3.

The size of the particles produced in a fractured glass sheet depends on the degree of toughening of the glass and in general the fineness of the particles increases with the degree of toughening. Hence the particles of relatively small size are produced in the more highly toughened areas 1, in the lesser toughened areas 2 larger particles are produced, and in the areas 3 and 5 having a medium toughening stress particles of medium size are produced. This distribution of small, larger and medium sized particles is produced over the whole surface of the fractured glass sheet. When the glass sheet is toughened to the degree described by U.S. Pat. No. 4,128,690 there are no splines in the fracture, and the requirements of the proposed E.E.C. Standard and of British Standard No. BS 5282 with regard to minimum and maximum particle sizes are met.

Figure 2:
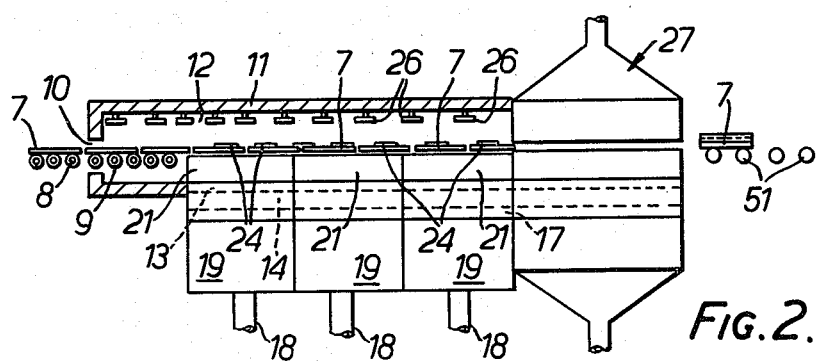
FIG. 2 is a side elevation partly in section of apparatus for carrying out the invention in which the glass sheet to be differentially toughened is transported on a gaseous support as it is heated and quenched.

When a toughened glass sheet is fractured the cracks tend to run substantially perpendicular to the direction of major principal stress in the glass. This is illustrated in FIG. 1 where the cracks tend to run perpendicular to the direction of the major principal stresses 4 and 6 in the areas 3 and 5 and are directed towards the more highly toughened areas 1 where particles of smaller size are produced. Since the major principal stresses in adjacent areas 3 and 5 are perpendicular to one another, a wavy type of fracture pattern results in which the size of the areas 3 and 5 limits the maximum length of the particles which can be produced. Hence the fracture pattern does not include elongate particles, or splines, of the kind which are found in the customary radial type of fracture pattern produced in a conventional uniformly toughened glass sheet. Apparatus as shown in FIG. 2 may be employed for transporting glass sheets on a gaseous support through a heating station to a quenching station. Flat sheets of glass 7 which are cut to the required shape for use as a side or rear window of a vehicle are fed in sequence on to asbestos covered conveyor rollers 8 at the loading end of the apparatus. The rollers 8 have collars 9 of slightly larger diameter than the major surfaces of the rollers and the glass sheets ride on the collars 9. The rollers 8 are inclined at a slight angle to the horizontal, for example an angle of about 5°. The sheets 7 are fed in sequence by the rollers 8 through an inlet 10 into a heating furnace comprising a tunnel structure including a roof 11 which has side walls 12. The sheets 7 are conveyed through the first part of the heating furnace on further asbestos covered rollers 8 and are then conveyed through the remaining length of the furnace on a base bed structure which generates a gaseous support for the glass sheets while they are heated. The bed structure comprises a base plate 13 which is a flat plate of heat-resistant stainless steel and which forms the roof of an exhaust chamber indicated at 14. The plate 13 is uniformly apertured for the passage of hot gases from outlet apertures 15, FIG. 3. Each of the apertures 15 for the passage of hot gases upwardly through the base plate 13 is defined by the bore of a supply tube 16 which is fitted into a hole in the base plate. The tops of the tubes 16 are flush with the top surface of the base plate 13 and the tubes 16 extend downwardly from the base plate 13 and are located at their lower ends in holes in a floor 17 of the exhaust chamber 14. Hot gases are supplied through ducts 18, FIG. 1 to plenum chambers 19. The floor 17 of the exhaust chamber 14 forms the roof of one of the plenum chambers 19.

The base plate 13 is also formed with equally interspersed exhaust openings 20 communicating with the exhaust chamber 14. Outlet apertures, not shown, in the walls of the exhaust chamber 14 allow gases to escape to atmosphere or for collection and recirculation.

The upper face of the base plate 13 is an accurately flat surface formed to receive in intimate engagement the lower face of a series of removable blocks 21 which are machined from heat-resistant stainless steel with their lower faces machined flat so that they can be slid into the apparatus from one side into gas-tight engagement with the upper surface of the base plate 13. The blocks 21 each have gas escape apertures 22 communicating with the outlet apertures 15 and gas exhaust apertures 23 communicating with the exhaust openings 20. Hot gases supplied through the ducts 18 into the plenum chambers 19 proceed upwardly through the tubes 16 and the apertures 22 in the block 21 and escape and expand above the upper surface of the block 21 to create a gaseous support under the advancing glass sheets 7.

Gas is continually released from the apertures 22 into the gaseous support for each glass sheet and simultaneously gas escapes from the gaseous support through the exhaust apertures 23 into the exhaust chamber 14 and thence to the outlet apertures.

The upper surfaces of the block 21 are transversely tilted so as to lie at the same small angle to the horizontal, for example 5°, as the conveyor rollers 8. The upper surfaces of the collars 9 on the conveyor rollers 8 are slightly higher than the level of the upper surface of the first block 21 so that as soon as each glass sheet 7 becomes completely and uniformly supported on the gaseous support it tends to slide down the transverse incline until it is in engagement with rotating discs 24 mounted alongside the blocks 21 on vertical spindles (not shown) which extend upwardly from drive motors (not shown) arranged outside the furnace which motors drive the discs at a controlled speed commensurate with the rate of advance of the glass sheets on to the gaseous support by the rollers 8. The collars 9 may be arranged so that if the sheets are already touching the collars then they will be in a position to be driven by the edge discs 24 without any substantial movement of the sheets down the transversely sloping upper surface of the first block 21.

The glass sheets are, as shown in FIG. 2, placed on the conveyor rollers end-to-end so that a succession of flat glass sheets 1 are advanced into the furnace by the driving action of the conveyor rollers.

As the glass sheets advance over the rollers 8 in the first part of the furnace and then subsequently over the blocks 21 on the gaseous support created by the presence of the sheets over the blocks they become heated by the hot gases of the supprt and by radiant heat from heaters 26 mounted in the roof structure over the path of travel of the glass sheets.

The edge discs 24 maintain the registration of the glass sheets in the furnace and also provide drive to cause the forward movement of the sheets. However, some of the discs 24 may be free running and act as rotatable guides.

In the apparatus of FIGS. 2 there are three sections to the furnace which are of identical construction. The construction of the last section is illustrated in FIG. 3, and by the time each glass sheet 7 reaches the end of the furnace the glass is at a temperature of the order of 630° C. to 670° C. for soda-lime-silica glass suitable for the thermal toughening of the glass by subjecting the glass to quenching gas flows, usually flows of air at ambient temperature.

Figure 3:
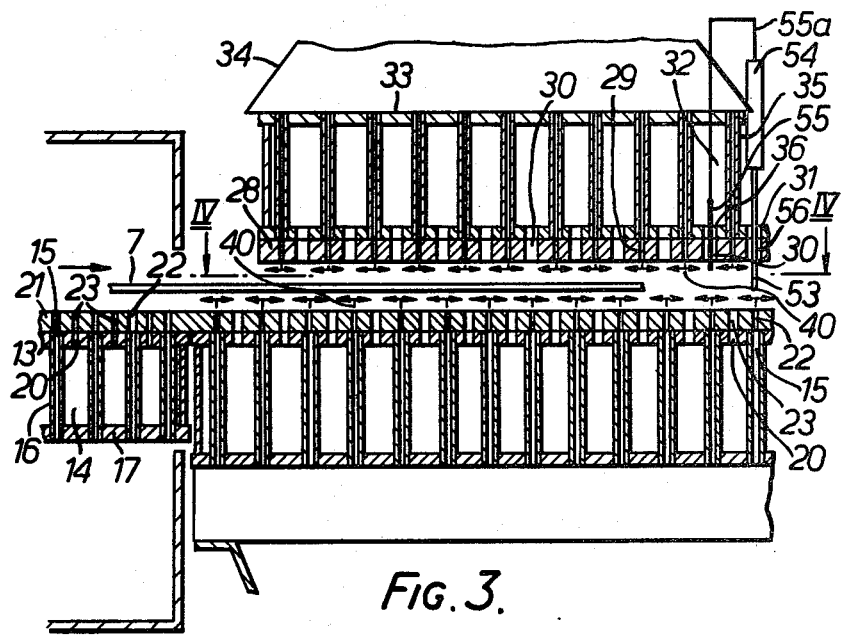
FIG. 3 is a sectional elevation of the quenching station forming part of the apparatus of FIG. 2, and showing means for arresting the advance of the glass sheet at the quenching station.

The advance of the hot glass sheets continues to a quenching station which is indicated generally at 27 in FIG. 2 and is shown in more detail in FIG. 3. At the quenching station the glass sheets are supported on a gaseous support generated above a bed of identical construction to the bed in the furnace except that the bed is supplied with chilling air at ambient temperature. The presence of each glass sheet advancing into the quenching station 27 from the furnace generates a gaseous cushion between the sheet and the upper surface of the bed which provides both the required support for the sheet and a flow of chilling air against the bottom surface of the glass sheet. The advance of the glass sheet into the quenching station is by means of rotating discs, not shown.

In the quenching section there is a generalised flow of quenching gas contacting the upper surface of the glass sheet which gas flow has a substantially identical chilling effect on the upper surface of the glass as the chilling effect of the lower surface by the gaseous support. The gas flows on the upper surface are generated from an upper gas supply and exhaust equipment of identical construction to the base bed supplying gas to and exhausting gas from the gaseous support.

As shown in FIG. 3 the upper part of the quenching station comprises a plate 28 of asbestos-based, heat-resistant material which has gas supply apertures 29 and gas exhaust apertures 30.

The plate 28 is fixed to an apertured base plate 31 of a gas exhaust chamber 32. The matching surfaces of the plates 28 and 31 are machined flat so as to be gas tight. The roof of the exhaust chamber 32 is a plate 33 which also forms the base of a plenum chamber 34 to which chilling air at ambient temperature is supplied. The chilling air passes through apertures in the plate 33 and is conducted down tubes 35 extending through the exhaust chamber 32 the lower ends of which tubes are fixed in the base plate 31 of the exhaust chamber and communicate with the gas supply apertures 29 in the plate 28. The gas exhaust apertures 30 in the plate 28 are aligned with exhaust apertures 36 in the plate 31 so that gas can escape from above the glass sheet into the exhaust chamber 32 whose walls have apertures so that the exhaust gases can be exhausted to atmosphere or collected and recirculated.

Figure 4:
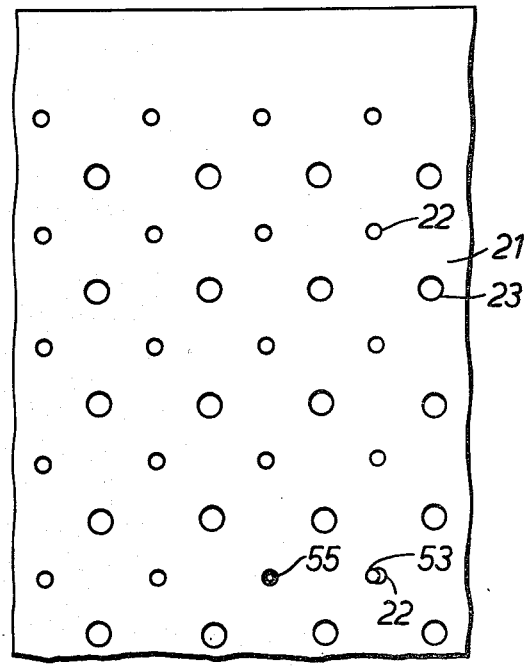
FIG. 4 is a view of the lower part of the quenching station on line IV—IV of FIG. 3.

The hot glass sheet is subjected to generalised quenching gas flows at the quenching station as it is advanced into the quenching station. As illustrated in FIG. 4 the gas supply apertures 22 in the plate 21 and the gas supply apertures 29 in the plate 28 are slightly inclined to the direction of advance of the glass so as to avoid the production of a striped toughening pattern in the glass sheet.

In one embodiment of the invention the advance of the glass sheet is halted when the whole of the glass sheet is within the quenching station by means of a plunger 53 (FIG. 3) which is operated by a solenoid 54. The plunger extends downwardly through a hole 56 in the plate 28. A proximity sensor such as a thermocouple 55 extends downwardly through the plate 28 in front of the plunger 53 in the direction of advance of the glass sheet. When the glass sheet has been advanced into the quenching station and the leading edge of the sheet reaches the thermocouple 55 a signal on line 55a from the thermocouple 55 to switching means associated with the solenoid 54 causes the plunger 53 to extend. The leading edge of the glass sheet engages the extended plunger 53 and the glass sheet comes to a halt in the quenching station. When the glass sheet is stationary in the quenching station the gas flows from the gas supply apertures 22 in the plate 21 and from the gas supply apertures 29 in the plate 28 act as illustrated by the arrows 40 in FIG. 3, on localised areas of the glass sheet so as to produce a distribution of regions of more highly toughened glass interspersed with regions of lesser toughened glass in the glass sheet, such as is shown in FIG. 1. At the end of a predetermined time governed by an adjustable timer, which is actuated by extension of the plunger 53, the solenoid 54 is de-energised to cause withdrawal of the plunger 53 and the advance of the glass sheet continues through the quenching station. The resultant toughened glass sheet emerges from the quenching station on rollers 51.

Figure 5:
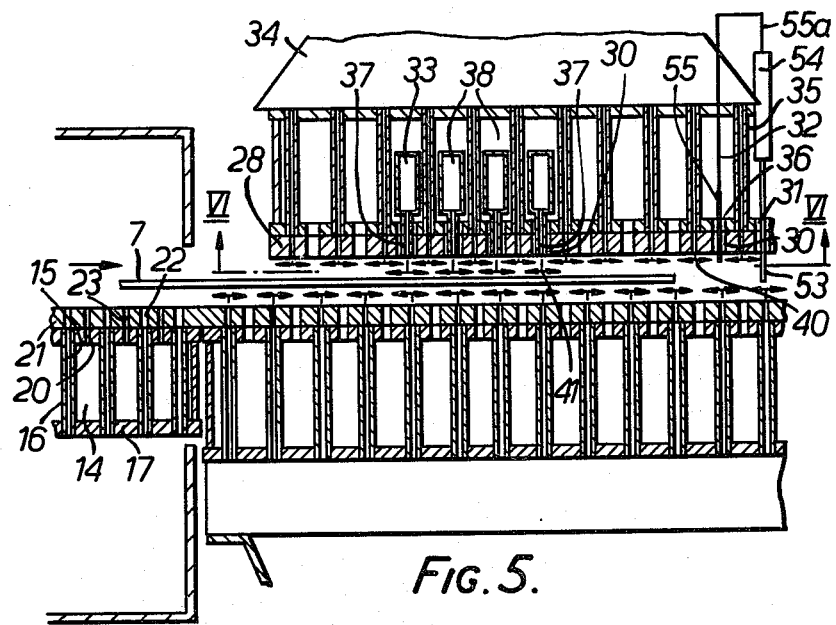
FIG. 5 is a sectional elevation of a modified form of the quenching station of FIG. 3.
Figure 6:
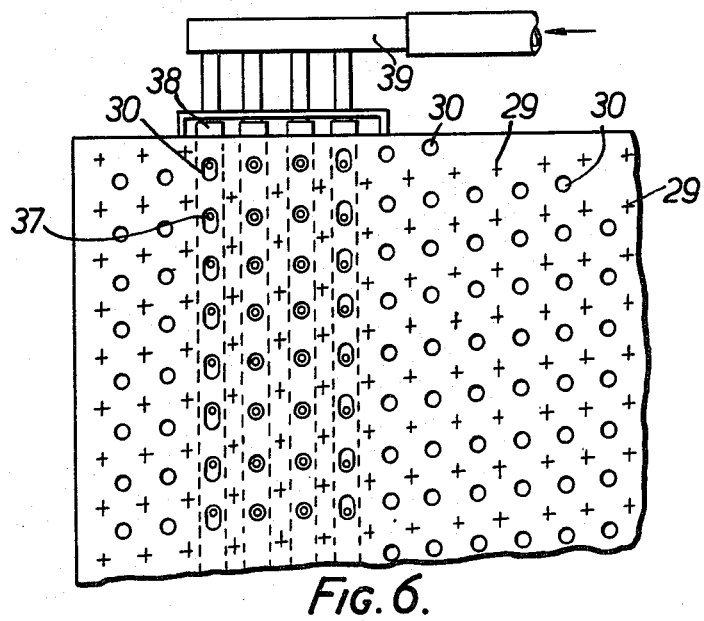
FIG. 6 is an underneath view of the upper part of the quenching station on line VI—VI of FIG. 5.
Figure 7:
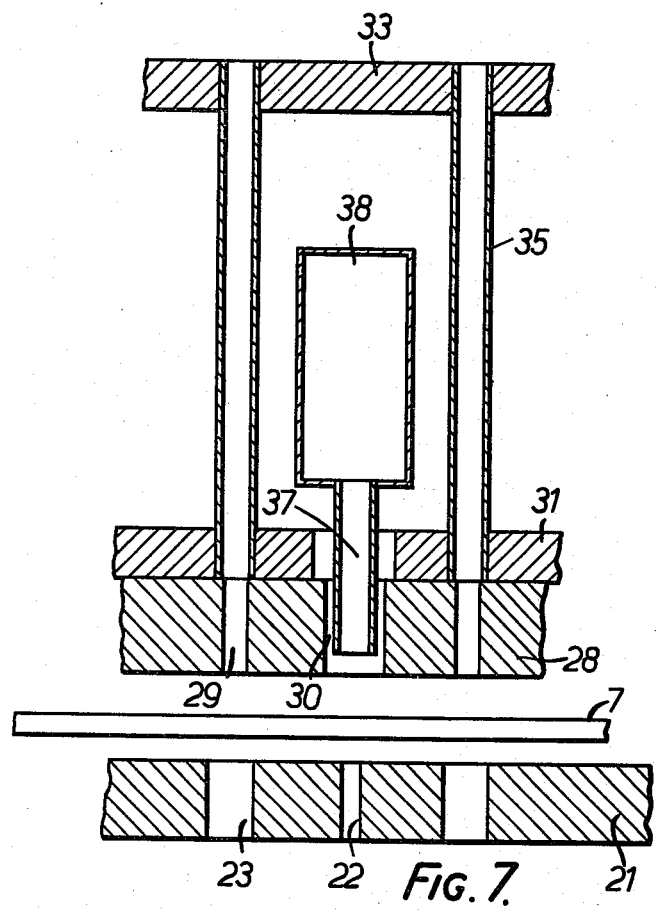
FIG. 7 is a detailed view of part of the quenching station of FIGS. 5 and 6.

In a modification of the above embodiment of the invention, as illustrated in FIGS. 5 and 6, the glass sheet is subjected to additional localised gas flows so as to intensify the differential toughening effect produced by the localised gas flows 40 from the gas supply apertures 22 and 29 in the plates 21 and 28. This is achieved by also subjecting the upper surface of the glass sheet when stationary in the quenching station to a rectangular array of gas jets which are spaced apart in rows transversely of the direction of advance of the glass with rows spaced apart in the direction of advance. The array of gas jets is provided by an array of gas supply nozzles 37 which are connected in rows to ducts 38 located in the exhaust chamber 32. The nozzles 37 extend downwardly through specially enlarged gas exhaust apertures 30 in the plate 28 as illustrated in FIG. 6.

One end of each of the ducts 38 is connected to an air supply manifold 39 located outside the exhaust chamber 32 alongside the quenching station.

In the embodiment illustrated there are four rows of nozzles 37 spaced apart at the same pitch as the gas exhaust apertures 30 in the direction of advance of the glass sheet.

An air supply to the manifold 39 is switched on when the glass sheet is stationary in the quenching station, and the manifold 39 is connected through a pressure regulator to a solenoid operated spool valve of conventional design. When the solenoid 54 is energised to extend the plunger 53 into the path of the glass sheet this also actuates a pressure switch which operates the spool valve to supply compressed air to the nozzles 37. The additional localised gas flows emerging from the nozzles 37, as illustrated by the arrows 41 in FIG. 5, act to intensify the production of the distribution of regions of more highly toughened glass interspersed with regions of lesser toughened glass in the part of the glass sheet which lies below the nozzles 37. When the glass sheet has been fully quenched the plunger 53 is raised, the supply of compressed air to the nozzles 37 is cut off and the advance of the glass sheet continues through the quenching station.

This embodiment of the invention has particular application for intensification of the differential toughening pattern over a localised area of the glass sheet in order to modify the fracture pattern in such an area which may be necessary in order to meet official fracture requirements.

However the array of nozzles 37 may extend over the whole of the quenching station so that the whole of the glass sheet is subjected to localised gas flows from the nozzles 37 if it is required to intensify the production of the distribution of differentially toughened areas of glass over the whole of the glass sheet.

In one example of operation of the apparatus described with reference to FIGS. 5 and 6 the compressed air supply switched to manifold 39 is at 690 kPa. The diameter of the bore of each of the nozzles 37 is 48 mm and the nozzle spacing is at 38 mm square pitch. The spacing of the ends of the nozzles from the upper surface of the glass supported on the gas cushion at the quenching station is 6 mm to 12 mm.

Figure 8:
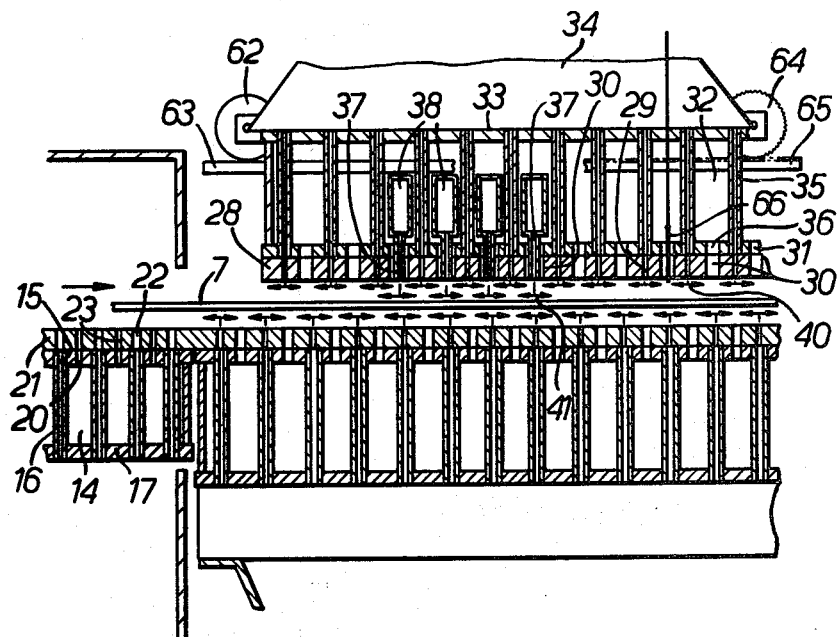
FIG. 8 is a sectional elevation through another embodiment of the quenching station.

FIG. 8 illustrates another method of operating the invention. At the quenching station the glass sheet floats on a gaseous support which is generated above an apertured base plate 21 of greater length than that of the glass sheet and quenching gas flows are applied to the glass sheet both from the plate 21 though gas supply apertures 22 and through gas supply apertures 29 in the plate 28 of the upper part of the quenching station in the manner described with reference to FIGS. 4 and 5.

The upper part of the quenching station comprising the plate 28 with the gas exhaust chamber 32 and the plenum chamber 34 is mounted on wheels 62 which run on a trackway 63 extending above and parallel to the lower apertured plate 21 of the quenching station. A pinion 64 mounted on the upper part of the quenching station engages with a fixed rack 65 extending alongside the trackway 63. When the pinion 64 is driven by a motor (not shown) this drives the upper part of the quenching station along the trackway 63 over the full length of the lower plate 21.

In operation of the arrangement shown in FIG. 8 the upper part of the quenching station is initially stationary and as shown in FIG. 8 is located above the left hand end of the lower apertured plate 21 adjacent to the furnace. A hot glass sheet is advanced from the furnace onto the plate 21 beneath the upper part of the quenching station and is subjected to the generalised gas flows at the quenching station as it moves into this position. When the hot glass sheet has moved fully into position under the stationary upper part of the quenching station this is sensed by a proximity detector 66 in the upper part of the quenching station which generates a signal initiating operation of the drive motor for the pinion 64 which drives the upper part of the quenching station along the trackway 63. The upper part of the quenching station is driven at a controlled speed equal to the speed of advance of the glass sheet along the lower apertured plate 21. While the upper part of the quenching station is being driven along the trackway 63 to follow the movement of the glass sheet the gas flows 40 from the gas supply apertures 29 in the plate 28 of the upper part of the quenching station act on localised areas of the upper face of the glass sheet so as to produce the required distribution of regions of more highly toughened glass interspersed with regions of lesser toughened glass in the glass sheet. When the upper part of the quenching station reaches a position above the right hand end of the lower apertured plate 21 it is stopped and is then returned to the left hand end of the plate 21 along the trackway 63 for quenching a succeeding glass sheet.

The upper part of the quenching station may also include nozzles 37 as in the arrangement of FIGS. 5 and 6 subjecting the upper face of the glass sheet to additional localised gas flows so as to intensify the differential toughening effect produced by the localised gas flows from the gas supply apertures 29 in the plate 28 of the upper part of the quenching station.

In a modification of the arrangement of FIG. 8 the lower part of the quenching station including the base plate 21 is mounted to be moved in correspondence with the upper part of the quenching station. A hot glass sheet is moved from the furnace onto the base plate 21. The glass sheet floats above the base plate 21 on the gaseous support and is carried forward by forward movement of the base plate 21 in correspondence with the movement of the upper part of the quenching station. In this case the base plate 21 need only be the same length as that of the upper part of the quenching station.

The method of the invention can be employed for the production of the required stress pattern in bent glass sheets using apparatus which is described and illustrated in United Kingdom Pat. No. 1,190,373. After heating, each glass sheet advances on to a transitional block whose thickness along its longitudinal centre line is the same as the thickness of the two blocks 21 but whose upper face is machined as a series of flats of gradually increasing angle which result in the upper surface of the block having the desired final curved form of the glass sheets. The glass advances on to this transitional block and is heated to a temperature such that it can sag downwardly to conform to the shape of the block. The block is apertured to provide a gaseous support created beneath the hot deformable glass as it slides over the block. This downward sagging increases progressively as the glass sheet advances and the glass which is still hot and deformable moves from the block onto a final part of the bed whose cross section conforms to the now curved shape of the glass sheet. The glass sheet advances over this curved section of the bed to the quenching station the upper and lower part of which are also suitably curved with a curved distribution of the nozzles 37 when provided in order to enhance the differential toughening effect.

Figure 9:
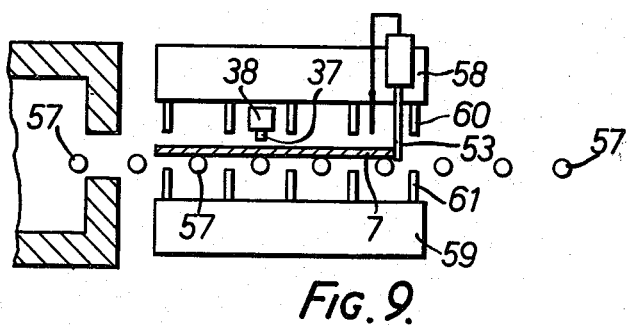
FIG. 9 illustrates the toughening of a glass sheet by the method of the invention while the sheet is supported on a roller conveyor.

FIG. 9 illustrates the toughening of a glass sheet 7 which is being advanced on a roller conveyor comprising a series of horizontal rollers 57.

The conveyor carries the glass sheet through a heating furnace to a quenching station where the rollers carry the glass sheet between upper and lower blowing boxes 58 and 59. The box 58 has an array of blowing nozzles 60 which point downardly towards the roller conveyor so as to direct quenching gas flows on to the upper surface of the glass sheet 7. The nozzles 60 are arranged at a slight angle to the direction of advance of the glass sheet in the same way as the supply and exhaust apertures in FIG. 4.

Similarly the lower blowing box 59 has upwardly projecting blowing nozzles 61 which are directed through the gaps between the rollers 57 and are also arranged at a slight angle to the direction of advance of the glass sheet.

These gas flows produce generalised overall toughening of the glass as the sheet advances on the conveyor into the quenching station.

The plunger 53 is mounted beneath the upper blowing box 58 and operates to arrest the advance of the sheet 7 when it is wholly within the quenching station. Gas flows from the nozzles 60 and 61 then act as localised gas flows applied to the upper and lower faces of the glass sheet, and are applied for a time sufficient to ensure that the glass sheet emerging from the quenching station on the roller conveyor has the required distrbution of regions of more highly toughened glass interspersed with regions of lesser toughened glass.

The arrangement of FIG. 9 may also include additional nozzles 37 as in the arrangement of FIGS. 5 and 6. Compressed air is switched to the nozzles 37 when the glass sheet is stationary between the upper and lower blowing boxes and localised air jets from the nozzles are directed against the faces of the glass sheet to intensify the differential toughening effect produced by the gas flows from the blowing box nozzles 60 and 61.

Alternatively instead of stopping the glass sheet between the blowing boxes 58 and 59 either one or both of the blowing boxes may be mounted as in the arrangement of FIG. 8 to be driven forward at the same speed of the glass sheet once the glass sheet has entered between the blowing boxes.

I claim:

1. A method of toughening a glass sheet comprising: advancing the glass sheet into and relative to a flow of quenching gas directed towards at least one surface of the glass sheet from individual gas outlets to induce overall toughening stresses therein, differentially toughening the glass sheet by terminating advance of the sheet relative to the flow of quenching gas for a predetermined time, whereby localised gas flows are applied to at least said one surface of the glass sheet from said individual gas outlets during said predetermined time to produce in the glass as the toughening stresses develop a distribution of regions of more highly toughened glass interspersed with regions of lesser toughened glass, in which distribution there are areas in which there are major and minor principal stresses acting in the plane of the glass sheet, and continuing the advance of the glass sheet relative to the flow of quenching gas after said predetermined time.

2. A method according to claim 1, in which the glass sheet is advanced into the flow of quenching gas and is halted in the flow for said predetermined time.

3. A method according to claim 1, in which the glass sheet is advanced into the flow of quenching gas and the individual gas outlets providing the flow of quenching gas are moved in the same direction and at the same speed as the glass sheet during said predetermined time.

4. A method according to claim 1, in which the glass sheet is advanced horizontally through a quenching station on a roller conveyor, and in which flows of quenching gas are directed from individual gas outlets against at least one surface of the glass sheet.

5. A method according to claim 1, in which the glass sheet is advanced horizontally through a quenching station on a gaseous support, and in which at least the lower surface of the glass sheet is subjected to a flow of quenching gas directed from individual gas outlets against the lower face of the sheet, said flow of quenching gas also providing the gaseous support for the sheet.

6. A method according to claim 1, in which the glass sheet is subjected to additional localised gas flows constituted by an array of gas jets operative on at least part of one or both faces of the glass sheet in addition to the main flow of quenching gas during the predetermined time in which advance of the glass sheet relative to the main flow of quenching gas is terminated.

7. A method according to claim 6, in which the gas jets in said array are spaced apart in rows transversely of the direction of advance of the glass sheet with the rows spaced apart in the direction of advance of the sheet.

8. A method of toughening a glass sheet comprising: advancing the glass sheet between flows of quenching gas directed from individual gas outlets towards both faces of the glass sheet to induce overall toughening stress therein, differentially toughening the glass sheet by terminating advance of the glass sheet relative to the flow of quenching gas operative on at least one face of the glass sheet for a predetermined time, whereby localised gas flows are applied to at least said one face of the glass sheet from said individual gas outlets during said predetermined time to produce in the glass as the toughening stresses develop a distribution of regions of more highly toughened glass interspersed with regions of lesser toughened glass, in which distribution there are areas in which there are major and minor principal stresses acting in the plane of the glass sheet, and continuing the advance of the glass sheet relative to the flow of quenching gas after said predetermined time.

9. A method according to claim 8, in which advance of the glass sheet relative to the flows of quenching gas operative on both faces of the glass is terminated for said predetermined time.

10. A method according to claim 8 or 9, in which the glass sheet is advanced into the flow of quenching gas and is halted in the flow for said predetermined time.

11. A method according to claim 8 or 9, in which the glass sheet is advanced into the flow of quenching gas and the individual gas outlets providing the flow of quenching gas are moved in the same direction and at the same speed as the glass sheet during said predetermined time.

12. A method according to claim 8 or 9, in which the glass sheet is advanced horizontally through a quenching station on a roller conveyor, and in which flows of quenching gas are directed from individual gas outlets against both faces of the glass sheet.

13. A method according to claim 8 or 9, in which the glass sheet is advanced horizontally through a quenching station on a gaseous support, and in which both faces of the glass sheet are subjected to flows of quenching gas directed from individual gas outlets against both faces of the sheet, the flow of quenching gas directed against the lower face of the sheet also providing the gaseous support for the sheet.

14. A method according to claim 8 or 9, in which the glass sheet is subjected to additional localised gas flows constituted by an array of gas jets operative on at least part of one or both faces of the glass sheet in addition to the main flow of quenching gas during the predetermined time in which advance of the glass sheet relative to the main flow of quenching gas is terminated.

15. A method according to claim 14, in which the gas jets in said array are spaced apart in rows transversely of the direction of advance of the glass sheet with the rows spaced apart in the direction of advance of the sheet.

* * * * *